US012495830B2

(12) United States Patent
Greenbaum

(10) Patent No.: US 12,495,830 B2
(45) Date of Patent: *Dec. 16, 2025

(54) VAPORIZATION DEVICE HAVING REMOTELY CONTROLLABLE OPERATIONAL MODES

(71) Applicant: GLAS, INC., Inglewood, CA (US)

(72) Inventor: Sean Greenbaum, Los Angeles, CA (US)

(73) Assignee: GLAS, INC., Inglewood, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/411,852

(22) Filed: Jan. 12, 2024

(65) Prior Publication Data

US 2024/0148059 A1 May 9, 2024

Related U.S. Application Data

(63) Continuation of application No. 17/147,235, filed on Jan. 12, 2021, now Pat. No. 11,903,416, and a (Continued)

(51) Int. Cl.
*A24F 40/40* (2020.01)
*A24F 1/32* (2006.01)
(Continued)

(52) U.S. Cl.
CPC ................ *A24F 40/40* (2020.01); *A24F 1/32* (2013.01); *A24F 40/60* (2020.01); *A24F 40/65* (2020.01); *G07C 9/27* (2020.01); *G07C 9/29* (2020.01)

(58) Field of Classification Search
CPC .......... A24F 40/40; A24F 40/60; A24F 40/65; G07C 9/27; G07C 9/29
See application file for complete search history.

(56) References Cited

U.S. PATENT DOCUMENTS

D140,839 S 4/1945 Carson
D197,689 S 3/1964 Levin et al.
(Continued)

FOREIGN PATENT DOCUMENTS

CN 1846179 A 10/2006
CN 201781060 U 3/2011
(Continued)

OTHER PUBLICATIONS

"Upgrade Your PAX," (2018). Available at: <URL:https://www.paxvapor.com/>.
(Continued)

*Primary Examiner* — Hae Moon Hyeon
(74) *Attorney, Agent, or Firm* — MARSHALL, GERSTEIN & BORUN LLP

(57) ABSTRACT

Vaporization devices having portions to enable signal transmission therethrough. A vaporization device includes a body having a first end, a second end, and forming an internal cavity. At least a portion of the internal cavity forming a cartridge receptacle. The vaporization device includes a battery disposed within the internal cavity and a processor operatively coupled to the battery and disposed within the body. The processor is arranged to respond to a signal to switch the vaporization device between a first operational mode and a second operational mode. The vaporization device also includes a portion of the body arranged to permit transmission of the signal through the portion of the body from a location external to the body, thereby permitting the processor to switch the vaporization device between the first and second operational modes in response to the receipt of the signal.

22 Claims, 6 Drawing Sheets

Related U.S. Application Data continuation of application No. 17/030,707, filed on Sep. 24, 2020, now Pat. No. 11,903,415, said application No. 17/147,235 is a continuation of application No. 17/030,707, filed on Sep. 24, 2020, now Pat. No. 11,903,415, and a continuation of application No. 16/932,416, filed on Jul. 17, 2020, now Pat. No. 10,952,476, said application No. 17/030,707 is a continuation of application No. 16/932,416, filed on Jul. 17, 2020, now Pat. No. 10,952,476, which is a continuation of application No. 16/674,922, filed on Nov. 5, 2019, now Pat. No. 10,750,791, said application No. 17/030,707 is a continuation of application No. 16/674,934, filed on Nov. 5, 2019, now Pat. No. 10,786,013, said application No. 16/932,416 is a continuation of application No. 16/674,920, filed on Nov. 5, 2019, now Pat. No. 10,757,980, and a continuation of application No. 16/674,934, filed on Nov. 5, 2019, now Pat. No. 10,786,013, said application No. 16/674,920 is a continuation of application No. 16/276,261, filed on Feb. 14, 2019, now Pat. No. 10,531,693, said application No. 16/674,934 is a continuation of application No. 16/276,261, filed on Feb. 14, 2019, now Pat. No. 10,531,693, said application No. 16/674,922 is a continuation of application No. 16/276,261, filed on Feb. 14, 2019, now Pat. No. 10,531,693.

(51) Int. Cl.

| | |
|---|---|
| ***A24F 40/60*** | (2020.01) |
| ***A24F 40/65*** | (2020.01) |
| ***G07C 9/27*** | (2020.01) |
| ***G07C 9/29*** | (2020.01) |

(56) References Cited

U.S. PATENT DOCUMENTS

| | | | |
|---|---|---|---|
| D237,017 | S | 9/1975 | Beaufour |
| D299,066 | S | 12/1988 | Newell et al. |
| D301,837 | S | 6/1989 | Peterson et al. |
| D329,253 | S | 9/1992 | Sekiguchi |
| D351,391 | S | 10/1994 | Martin |
| D401,011 | S | 11/1998 | Sloan, II |
| D424,739 | S | 5/2000 | Ross |
| D470,529 | S | 2/2003 | Tu |
| D479,712 | S | 9/2003 | Ng |
| D485,639 | S | 1/2004 | Stronski |
| 6,679,425 | B1 | 1/2004 | Sheppard et al. |
| D513,005 | S | 12/2005 | Kobayakawa |
| D527,817 | S | 9/2006 | Ziegler et al. |
| D532,927 | S | 11/2006 | Sann |
| D535,308 | S | 1/2007 | Andre et al. |
| D540,687 | S | 4/2007 | Egawa |
| D542,789 | S | 5/2007 | Depay |
| D545,904 | S | 7/2007 | Chen et al. |
| D558,060 | S | 12/2007 | Sir et al. |
| D562,151 | S | 2/2008 | Larocca et al. |
| D569,727 | S | 5/2008 | Moretti |
| 7,385,874 | B2 | 6/2008 | Vuilleumier et al. |
| D577,591 | S | 9/2008 | Bouroullec et al. |
| D579,498 | S | 10/2008 | Bhavnani et al. |
| D599,670 | S | 9/2009 | Qin |
| D602,089 | S | 10/2009 | Keda |
| D614,346 | S | 4/2010 | Lik |
| D616,753 | S | 6/2010 | Beam et al. |
| D623,192 | S | 9/2010 | Peng |
| D631,885 | S | 2/2011 | Maier |
| D633,560 | S | 3/2011 | Clivic |
| D645,817 | S | 9/2011 | Sasada et al. |
| 8,107,953 | B2 | 1/2012 | Zimmerman et al. |
| D667,874 | S | 9/2012 | Chen |
| D669,123 | S | 10/2012 | Jiang |
| D670,272 | S | 11/2012 | Suzuki |
| 8,433,302 | B2 | 4/2013 | Hunter et al. |
| D682,698 | S | 5/2013 | Young |
| D684,311 | S | 6/2013 | Liu |
| D689,999 | S | 9/2013 | Viala |
| D697,616 | S | 1/2014 | Berry et al. |
| D700,397 | S | 2/2014 | Manca et al. |
| D700,738 | S | 3/2014 | Rennick et al. |
| D711,891 | S | 8/2014 | Emami et al. |
| 8,833,364 | B2 | 9/2014 | Buchberger |
| D718,492 | S | 11/2014 | Albanese |
| 8,897,628 | B2 | 11/2014 | Conley et al. |
| D720,095 | S | 12/2014 | Alima |
| D720,881 | S | 1/2015 | Liu |
| D721,202 | S | 1/2015 | Liu |
| D723,216 | S | 2/2015 | Chen |
| D725,310 | S | 3/2015 | Eksouzian |
| D725,821 | S | 3/2015 | Levin et al. |
| D725,822 | S | 3/2015 | Liu |
| D728,155 | S | 4/2015 | Liu |
| D728,156 | S | 4/2015 | Wu |
| D732,239 | S | 6/2015 | Chen |
| D732,733 | S | 6/2015 | Spagnolo et al. |
| D733,050 | S | 6/2015 | Chiang |
| D735,661 | S | 8/2015 | Miller et al. |
| D738,302 | S | 9/2015 | Jeong et al. |
| D739,973 | S | 9/2015 | Chao |
| D743,887 | S | 11/2015 | Dasbach |
| D743,889 | S | 11/2015 | Lyles et al. |
| D749,777 | S | 2/2016 | Quesada |
| D750,320 | S | 2/2016 | Verleur et al. |
| 9,247,773 | B2 | 2/2016 | Memari et al. |
| D750,821 | S | 3/2016 | Rusay |
| D751,249 | S | 3/2016 | Chen |
| D752,284 | S | 3/2016 | Doster |
| D754,138 | S | 4/2016 | Otsuka et al. |
| D754,377 | S | 4/2016 | Nook et al. |
| D757,352 | S | 5/2016 | Bagai |
| D757,353 | S | 5/2016 | Nunnelly et al. |
| D757,994 | S | 5/2016 | Moradian |
| D758,650 | S | 6/2016 | Wu |
| D758,651 | S | 6/2016 | Wu |
| D759,303 | S | 6/2016 | Afridi |
| D760,948 | S | 7/2016 | Eksouzian |
| D762,003 | S | 7/2016 | Lomeli |
| D762,564 | S | 8/2016 | Patton et al. |
| D763,502 | S | 8/2016 | Verleur et al. |
| 9,436,216 | B2 | 9/2016 | Yukawa et al. |
| D768,068 | S | 10/2016 | Chen |
| D768,920 | S | 10/2016 | Jones et al. |
| D770,676 | S | 11/2016 | Bennett et al. |
| D773,727 | S | 12/2016 | Eksouzian |
| D776,337 | S | 1/2017 | Levin et al. |
| D776,338 | S | 1/2017 | Lomeli |
| D776,848 | S | 1/2017 | Eastman, II |
| D776,869 | S | 1/2017 | Heidl |
| D778,828 | S | 2/2017 | Morgan |
| D779,719 | S | 2/2017 | Qiu |
| D786,497 | S | 5/2017 | Sudlow et al. |
| D788,697 | S | 6/2017 | Verleur et al. |
| D790,123 | S | 6/2017 | Beer et al. |
| D790,680 | S | 6/2017 | Afridi |
| D792,643 | S | 7/2017 | Wong et al. |
| D793,004 | S | 7/2017 | Liu |
| 9,743,691 | B2 | 8/2017 | Minskoff et al. |
| D799,110 | S | 10/2017 | Qiu |
| D799,112 | S | 10/2017 | Qiu |
| D799,113 | S | 10/2017 | Qiu |
| D799,744 | S | 10/2017 | Qiu |
| D799,745 | S | 10/2017 | Qiu |
| D799,748 | S | 10/2017 | Freese |
| D799,749 | S | 10/2017 | Freese |
| D800,383 | S | 10/2017 | Verleur et al. |
| D802,839 | S | 11/2017 | Scott |
| D804,717 | S | 12/2017 | Wang et al. |
| D805,685 | S | 12/2017 | Lee |
| D806,311 | S | 12/2017 | Smith |

(56) References Cited

U.S. PATENT DOCUMENTS

| | | | |
|---|---|---|---|
| D808,071 S | 1/2018 | Folkerts et al. | |
| D809,648 S | 2/2018 | Ohrt et al. | |
| D811,003 S | 2/2018 | Folyan | |
| 9,894,938 B2 | 2/2018 | Vick et al. | |
| D813,447 S | 3/2018 | Watson | |
| D815,341 S | 4/2018 | Qiu | |
| D818,636 S | 5/2018 | Qiu | |
| D818,638 S | 5/2018 | Wright et al. | |
| D818,639 S | 5/2018 | Kayvon et al. | |
| D819,263 S | 5/2018 | Zhu | |
| D819,881 S | 6/2018 | Qiu | |
| D820,514 S | 6/2018 | Durand | |
| D820,515 S | 6/2018 | Nettenstrom et al. | |
| D821,867 S | 7/2018 | Oligschlaeger | |
| D822,271 S | 7/2018 | Eksouzian | |
| D822,896 S | 7/2018 | Durand | |
| D824,093 S | 7/2018 | Kauss | |
| D824,096 S | 7/2018 | Qiu | |
| D825,099 S | 8/2018 | Wright et al. | |
| D825,102 S | 8/2018 | Bowen et al. | |
| D825,834 S | 8/2018 | Chen | |
| D827,195 S | 8/2018 | Chen | |
| D829,371 S | 9/2018 | Durand | |
| D829,372 S | 9/2018 | Huang et al. | |
| D829,373 S | 9/2018 | Huang et al. | |
| D829,980 S | 10/2018 | Qiu | |
| D831,885 S | 10/2018 | Wang et al. | |
| D832,499 S | 10/2018 | Qiu | |
| D832,500 S | 10/2018 | Qiu | |
| 10,104,915 B2 | 10/2018 | Bowen et al. | |
| 10,111,470 B2 | 10/2018 | Monsees et al. | |
| D834,246 S | 11/2018 | Qiu | |
| D834,744 S | 11/2018 | Zhu | |
| 10,117,465 B2 | 11/2018 | Monsees et al. | |
| 10,117,466 B2 * | 11/2018 | Monsees | A24F 40/46 |
| 10,130,123 B2 | 11/2018 | Hatton et al. | |
| D835,337 S | 12/2018 | Beer et al. | |
| D835,577 S | 12/2018 | Zhang | |
| D836,190 S | 12/2018 | Evans et al. | |
| D836,541 S | 12/2018 | Lomeli | |
| D836,831 S | 12/2018 | Cividi | |
| D837,446 S | 1/2019 | Durand | |
| D838,899 S | 1/2019 | Qiu | |
| D838,900 S | 1/2019 | Freese | |
| D841,010 S | 2/2019 | Kong et al. | |
| 10,194,696 B2 * | 2/2019 | Matischek | G06F 21/34 |
| D842,535 S | 3/2019 | Kauss | |
| D842,536 S | 3/2019 | Bowen et al. | |
| D843,644 S | 3/2019 | Qiu | |
| D844,229 S | 3/2019 | Sherwood et al. | |
| D844,235 S | 3/2019 | Cividi | |
| D844,236 S | 3/2019 | Tidnam et al. | |
| D844,240 S | 3/2019 | Kauss | |
| 10,219,547 B2 | 3/2019 | Wang et al. | |
| 10,226,076 B2 | 3/2019 | Althorpe et al. | |
| D849,996 S | 5/2019 | Duque et al. | |
| 10,327,479 B2 | 6/2019 | Popplewell et al. | |
| D855,251 S | 7/2019 | Qiu et al. | |
| D858,868 S | 9/2019 | Bowen et al. | |
| D858,869 S | 9/2019 | Bowen et al. | |
| D858,870 S | 9/2019 | Bowen et al. | |
| D864,476 S | 10/2019 | Qiu | |
| D865,279 S | 10/2019 | Pino et al. | |
| D866,064 S | 11/2019 | Powell et al. | |
| D870,368 S | 12/2019 | Leon Duque et al. | |
| D870,369 S | 12/2019 | Greenbaum et al. | |
| D870,370 S | 12/2019 | Greenbaum et al. | |
| D870,372 S | 12/2019 | Zhu | |
| D870,373 S | 12/2019 | Greenbaum et al. | |
| D870,374 S | 12/2019 | Greenbaum et al. | |
| D871,669 S | 12/2019 | Lee | |
| D872,934 S | 1/2020 | Powell et al. | |
| 10,531,693 B1 | 1/2020 | Greenbaum | |
| D875,302 S | 2/2020 | Pan | |
| D875,303 S | 2/2020 | Pan | |
| D875,305 S | 2/2020 | Lai | |
| D875,306 S | 2/2020 | Pan | |
| D876,006 S | 2/2020 | Qiu et al. | |
| D877,409 S | 3/2020 | Jiang | |
| D877,977 S | 3/2020 | Ding et al. | |
| 10,653,189 B1 | 5/2020 | Greenbaum | |
| 10,750,791 B1 | 8/2020 | Greenbaum | |
| 10,757,980 B1 | 9/2020 | Greenbaum | |
| 10,786,013 B2 | 9/2020 | Greenbaum | |
| 10,952,476 B2 | 3/2021 | Greenbaum | |
| 11,051,550 B2 | 7/2021 | Lin et al. | |
| 11,297,879 B2 | 4/2022 | Scatterday | |
| 11,369,143 B2 | 6/2022 | Greenbaum | |
| 2011/0265806 A1 | 11/2011 | Alarcon et al. | |
| 2012/0048266 A1 | 3/2012 | Alelov | |
| 2013/0068239 A1 | 3/2013 | Youn | |
| 2013/0319439 A1 | 12/2013 | Gorelick et al. | |
| 2014/0060552 A1 | 3/2014 | Cohen | |
| 2014/0116455 A1 | 5/2014 | Youn | |
| 2014/0218305 A1 | 8/2014 | Beasley et al. | |
| 2014/0378790 A1 | 12/2014 | Cohen | |
| 2015/0034104 A1 | 2/2015 | Zhou | |
| 2015/0101625 A1 | 4/2015 | Newton et al. | |
| 2015/0114407 A1 | 4/2015 | Duncan et al. | |
| 2015/0136158 A1 | 5/2015 | Stevens et al. | |
| 2015/0150305 A1 | 6/2015 | Shenkal | |
| 2015/0181945 A1 | 7/2015 | Tremblay | |
| 2015/0327596 A1 * | 11/2015 | Alarcon | H04L 67/535 131/328 |
| 2015/0333561 A1 | 11/2015 | Alarcon | |
| 2015/0342255 A1 | 12/2015 | Wu | |
| 2016/0106936 A1 | 4/2016 | Kimmel | |
| 2016/0198771 A1 | 7/2016 | Goggin et al. | |
| 2016/0278435 A1 | 9/2016 | Choukroun et al. | |
| 2016/0315488 A1 | 10/2016 | Moon | |
| 2016/0331036 A1 | 11/2016 | Cameron | |
| 2016/0345626 A1 | 12/2016 | Wong et al. | |
| 2016/0360789 A1 | 12/2016 | Hawes et al. | |
| 2017/0020188 A1 | 1/2017 | Cameron | |
| 2017/0042230 A1 | 2/2017 | Cameron | |
| 2017/0042246 A1 | 2/2017 | Lau et al. | |
| 2017/0108840 A1 | 4/2017 | Hawes et al. | |
| 2017/0119044 A1 | 5/2017 | Oligschlaeger et al. | |
| 2017/0135411 A1 * | 5/2017 | Cameron | A24F 40/50 |
| 2017/0258142 A1 | 9/2017 | Hatton et al. | |
| 2017/0308889 A1 | 10/2017 | Cameron et al. | |
| 2017/0360098 A1 | 12/2017 | Newcomb et al. | |
| 2018/0020720 A1 | 1/2018 | Matischek et al. | |
| 2018/0037381 A1 | 2/2018 | White et al. | |
| 2018/0043114 A1 | 2/2018 | Bowen et al. | |
| 2018/0098568 A1 | 4/2018 | Qiu | |
| 2018/0098571 A1 | 4/2018 | Watson | |
| 2018/0153221 A1 | 6/2018 | Verleur et al. | |
| 2018/0205052 A1 | 7/2018 | Chen | |
| 2018/0214645 A1 | 8/2018 | Reevell | |
| 2018/0263283 A1 | 9/2018 | Popplewell et al. | |
| 2018/0279682 A1 | 10/2018 | Guo et al. | |
| 2018/0295886 A1 | 10/2018 | Freeman et al. | |
| 2018/0310618 A1 | 11/2018 | Watson | |
| 2018/0317557 A1 | 11/2018 | Monsees et al. | |
| 2018/0338527 A1 | 11/2018 | Sur | |
| 2018/0360129 A1 | 12/2018 | Bowen et al. | |
| 2018/0368473 A1 | 12/2018 | Fraijo | |
| 2018/0368475 A1 | 12/2018 | Smith et al. | |
| 2019/0000148 A1 | 1/2019 | Atkins et al. | |
| 2019/0029319 A1 | 1/2019 | Moorman | |
| 2019/0037926 A1 | 2/2019 | Qiu | |
| 2019/0053542 A1 | 2/2019 | Chen | |
| 2019/0158938 A1 * | 5/2019 | Bowen | A24F 40/65 |
| 2019/0159519 A1 | 5/2019 | Bowen et al. | |
| 2019/0166913 A1 * | 6/2019 | Trzecieski | A61M 15/06 |
| 2019/0183185 A1 | 6/2019 | Manas et al. | |
| 2019/0373679 A1 | 12/2019 | Fu et al. | |
| 2019/0387800 A1 | 12/2019 | Lin et al. | |
| 2020/0345078 A1 | 11/2020 | Greenbaum | |
| 2021/0007414 A1 | 1/2021 | Greenbaum | |
| 2021/0127751 A1 | 5/2021 | Greenbaum | |

(56) References Cited

U.S. PATENT DOCUMENTS

| | | | |
|---|---|---|---|
| 2021/0378298 | A1 | 12/2021 | Greenbaum |
| 2021/0378299 | A1 | 12/2021 | Greenbaum |

FOREIGN PATENT DOCUMENTS

| | | | |
|---|---|---|---|
| CN | 203911991 | U | 10/2014 |
| CN | 204143299 | U | 2/2015 |
| CN | 304170167 | S | 6/2017 |
| CN | 107702671 | A | 2/2018 |
| CN | 304680038 | S | 6/2018 |
| CN | 108253869 | A | 7/2018 |
| CN | 108348001 | A | 7/2018 |
| CN | 108348002 | A | 7/2018 |
| CN | 304738998 | S | 7/2018 |
| CN | 304813370 | S | 9/2018 |
| CN | 304818487 | S | 9/2018 |
| CN | 304835757 | S | 9/2018 |
| CN | 304910115 | S | 11/2018 |
| CN | 109068740 | A | 12/2018 |
| CN | 304976973 | S | 1/2019 |
| CN | 304976994 | S | 1/2019 |
| CN | 304994603 | S | 1/2019 |
| CN | 305005360 | S | 1/2019 |
| CN | 305033275 | | 2/2019 |
| CN | 305033283 | S | 2/2019 |
| EP | 3130238 | B1 | 5/2018 |
| JP | 2015-528290 | A | 9/2015 |
| TW | D176881 | S | 7/2016 |
| TW | D183698 | | 6/2017 |
| WO | WO-2016187123 | A2 | 11/2016 |
| WO | WO-2017/055803 | A1 | 4/2017 |
| WO | WO-2017178994 | A1 | 10/2017 |
| WO | WO-2018/146735 | A1 | 8/2018 |

OTHER PUBLICATIONS

BB Tank by Alibaba. dated 2019. found online [Apr. 11, 2019] <https://www.alibaba.conn/product-detail/Pods-system-100-no-leaking-flat> 60740861308.htnnl.

Eleaf Elven Pod by Eleaf. dated 2018. found online [Apr. 11, 2019] <https://www.eleafworld.com/online/products/kits/> eleaf-elven-pod-system-kit-360nnah.htnnl.

Take control of your PAX experience with the PAX Mobile app. Website: https://www.paxvapor.com/pax-app/ (last visited: Mar. 12, 2019).

U.S. Appl. No. 29/680,301, Notice of Allowance, mailed Aug. 21, 2019.

U.S. Appl. No. 29/680,301, Office Action, mailed Apr. 16, 2019.

U.S. Appl. No. 29/680,302, Notice of Allowance, mailed Aug. 21, 2019.

U.S. Appl. No. 29/680,302, Office Action, mailed Apr. 16, 2019.

U.S. Appl. No. 29/680,303, Notice of Allowance, mailed Aug. 21, 2019.

U.S. Appl. No. 29/680,303, Office Action, mailed Apr. 30, 2019.

U.S. Appl. No. 29/680,310, Notice of Allowance, mailed Aug. 21, 2019.

U.S. Appl. No. 29/680,310, Office Action, mailed Apr. 30, 2019.

U.S. Appl. No. 16/276,261, Nonfinal Office Action, dated Jun. 12, 2019.

U.S. Appl. No. 16/276,261, Notice of Allowance, dated Nov. 29, 2019.

U.S. Appl. No. 16/674,915, Notice of Allowance, dated Jan. 10, 2020.

U.S. Appl. No. 16/674,920, Nonfinal Office Action, Jan. 14, 2020.

International Application No. PCT/US2019/061356, International Search Report and Written Opinion, mailed Feb. 10, 2020.

U.S. Appl. No. 16/674,920, Notice of Allowance, dated Apr. 21, 2020.

U.S. Appl. No. 16/674,922, Nonfinal Office Action, dated Jan. 23, 2020.

U.S. Appl. No. 16/674,922, Notice of Allowance, mailed Apr. 23, 2020.

U.S. Appl. No. 16/674,934, Nonfinal Office Action, dated Jan. 24, 2020.

U.S. Appl. No. 16/674,934, Notice of Allowance, dated May 5, 2020.

International Search Report and Written Opinion for Application No. PCT/US2019/061356 dated Aug. 26, 2021.

U.S. Appl. No. 17/410,829, Nonfinal Office Action, dated Nov. 3, 2021.

U.S. Appl. No. 16/932,416, Notice of Allowance, dated Feb. 22, 2021.

U.S. Appl. No. 16/932,416, Nonfinal Office Action, dated Aug. 18, 2020.

U.S. Appl. No. 29/712,230, Final Office Action, dated Aug. 20, 2020.

U.S. Appl. No. 29/712,230, Nonfinal Office Action, dated Mar. 16, 2020.

U.S. Appl. No. 17/410,817, Nonfinal Office Action, dated Nov. 3, 2021.

U.S. Appl. No. 17/410,877, Nonfinal Office Action, dated Dec. 29, 2021.

U.S. Appl. No. 17/410,829, Final Office Action, dated Feb. 11, 2022.

U.S. Appl. No. 17/410,817, Final Office Action, Feb. 11, 2022.

Chinese Office Action, Chinese Patent Application No. 201980092050.8, dated Jun. 6, 2024.

European Patent Application No. 19817863.4, Communication Pursuant to Article 94(3) EPC, dated Jun. 2, 2025.

Ryan, Radio frequency propagation differences through various transmissive materials, Thesis prepared for the degree of Master of Science, University of North Texas (Dec. 2002).

Canadian Patent Application No. 3121570, Examination Report dated Jun. 12, 2025.

* cited by examiner

VAPORIZATION DEVICE HAVING REMOTELY CONTROLLABLE OPERATIONAL MODES

FIELD OF THE DISCLOSURE

The present patent relates generally to vaporization devices and, in particular, to vaporization devices that can be enabled or disabled remotely.

BACKGROUND

Vaporization devices are generally well known in the art. Such devices are typically battery-powered and are often used as smoking substitutes, to simulate smoking or as a smoking sensation aid. Vaporization devices typically include a battery, a heating element and a cartridge that contains a storage container that houses a vapor forming medium. The vapor forming medium often includes a liquid suspension containing nicotine, or one of many other vaporizable substances commonly employed in the art. In practice, the user draws air through the device via a mouthpiece, which activates the heating element such that the vapor forming medium is heated by the heating element to form the resulting vapor. The vapor may be mixed with the air drawn by the user to form an inhalable aerosol.

Those familiar with the industry may be concerned about use of the vaporization device by an unauthorized user. An unauthorized user may be someone who doesn't own the device, or may be, for example, a minor. Consequently, there exists a need in the art for a manner of limiting access to the device to only an authorized user or users.

SUMMARY

In accordance with a first example, a vaporization device includes a body having a first end, a second end, and forming an internal cavity. At least a portion of the internal cavity forms a cartridge receptacle that is sized to receive a cartridge having a storage container of vaporizable liquid. The vaporization device includes a heating element and a battery operatively coupled to one another and disposed within the internal cavity. The heating element is arranged to apply heat to and vaporize a quantity of the vaporizable liquid in the storage container. The vaporization device also includes a processor operatively coupled to the battery and the heating element and disposed within the body. The processor is arranged to respond to a signal to switch the vaporization device between a first operational mode and a second operational mode. A portion of the body is arranged to permit transmission of the signal through the portion of the body from a location external to the body, thereby permitting the processor to switch the vaporization device between the first and second operational modes in response to the receipt of the signal.

In accordance with a second example, a vaporization device includes a body having a first end, a second end, and forming an internal cavity. At least a portion of the internal cavity forms a cartridge receptacle. The vaporization device includes a cartridge having a mouthpiece and a storage container for storing a vaporizable liquid. The vaporization device includes a battery disposed in the cavity and arranged to power a heating element. The heating element is positioned to apply heat to and vaporize a quantity of the vaporizable liquid in response to activation by a user. A processor is operatively coupled to the battery and disposed within the body. The processor is arranged to respond to an external signal to switch the heating element between a first operational mode and a second operational mode. The processor is further arranged to generate a response signal. A mobile device is arranged to send the external signal and to receive the response signal. A portion of the body is arranged to permit transmission of the external signal through the portion of the body from a location external to the body, thereby causing the processor to switch the vaporization device between the first and second operational modes in response to the receipt of the signal. The portion of the body is further arranged to permit transmission of the response signal through the portion of the body from a location within the body, thereby allowing the mobile device to indicate a status of the vaporization device.

In accordance with a third example, a vaporization device includes a body forming an internal cavity. At least a portion of the internal cavity forming a cartridge receptacle. A female structure is defined by an exterior surface at an end of the body adjacent the cartridge receptacle. A battery is disposed in the internal cavity. A cartridge includes a housing and a mouthpiece positioned adjacent the housing. The mouthpiece includes a male structure. The female structure receives the male structure when the housing of the cartridge is received within the cartridge receptacle to laterally support the cartridge within the cartridge receptacle.

In accordance with a fourth example, a vaporization device includes a body having a first end, a second end, and forming an internal cavity. At least a portion of the internal cavity forms a cartridge receptacle. A battery is disposed within the internal cavity. A processor is operatively coupled to the battery and disposed within the body. The processor is arranged to respond to a signal to switch the vaporization device between a first operational mode and a second operational mode. A portion of the body is arranged to permit transmission of the signal through the portion of the body from a location external to the body, thereby permitting the processor to switch the vaporization device between the first and second operational modes in response to the receipt of the signal.

In further accordance with the foregoing first, second, third and/or fourth examples, an apparatus and/or method may further include any one or more of the following:

In accordance with one example, the processor is arranged to respond to an activation code carried by the signal.

In accordance with another example, the first operational mode is an inoperable mode and the second operational mode is an operable mode.

In accordance with another example, either of the first or second operational modes includes a power mode, a sensitivity mode, or a use mode.

In accordance with another example, further including a receiver operatively coupled to the processor, the receiver arranged to receive the signal through the portion of the body and to communicate the signal to the processor.

In accordance with another example, the body includes a first material and the portion of the body is formed of a second material different than the first material, the second material selected to permit passage of the signal through the portion of the body.

In accordance with another example, the portion of the body includes an opening to permit passage of the signal through the portion of the body.

In accordance with another example, further including a cover disposed over the opening, the cover formed of a material selected to permit passage of the signal through the opening.

In accordance with another example, the cover material includes plastic.

In accordance with another example, further including an illumination assembly arranged to display a light signal.

In accordance with another example, the illumination assembly is disposed inside the body and the light signal is transmitted through a second portion of the body.

In accordance with another example, the second portion of the body is translucent.

In accordance with another example, further including an illumination assembly arranged to display a first light signal indicative of a first status and a second light signal indicative of a second status.

In accordance with another example, the first status is indicative of the first operational mode and the second status is indicative of the second operational mode.

In accordance with another example, the illumination assembly is arranged such that the first light signal is a first color and the second light signal is a second color different from the first color.

In accordance with another example, the external signal carries an authentication code.

In accordance with another example, the body is formed of a first material that inhibits passage of the external or response signals through portions of the body formed of the first material, and the portion of the body is formed of a second material that allows passage of the external or response signals through the portion of the body.

In accordance with another example, the first material includes a metal, and the second material includes a plastic.

In accordance with another example, further including a server, the server is arranged to access identifying information from the mobile device, in response to the identifying information matching reference identifying information, the processor provides an authentication code accessible by the mobile device, the authentication code to be provided to the processor via the external signal.

In accordance with another example, the female structure includes a notch and the male structure includes a protrusion of the mouthpiece.

In accordance with another example, the body includes a metal body having an opening, the vaporization device further including a cover covering the opening and includes a material different from the metal body, the material capable of permitting transmission of a signal through the cover.

DETAILED DESCRIPTION

Although the following text discloses a detailed description of one or more disclosed examples, it should be understood that the legal scope of the property right is defined by the words of the claims set forth at the end of this patent. Accordingly, the following detailed description is to be construed as illustrating examples, but does not describe every possible example, as describing every possible example would be impractical, if not impossible. Numerous alternative examples could be implemented, using either current technology or technology developed after the filing date of this patent. It is envisioned that such alternative examples would still fall within the scope of the claims.

Figure 1:
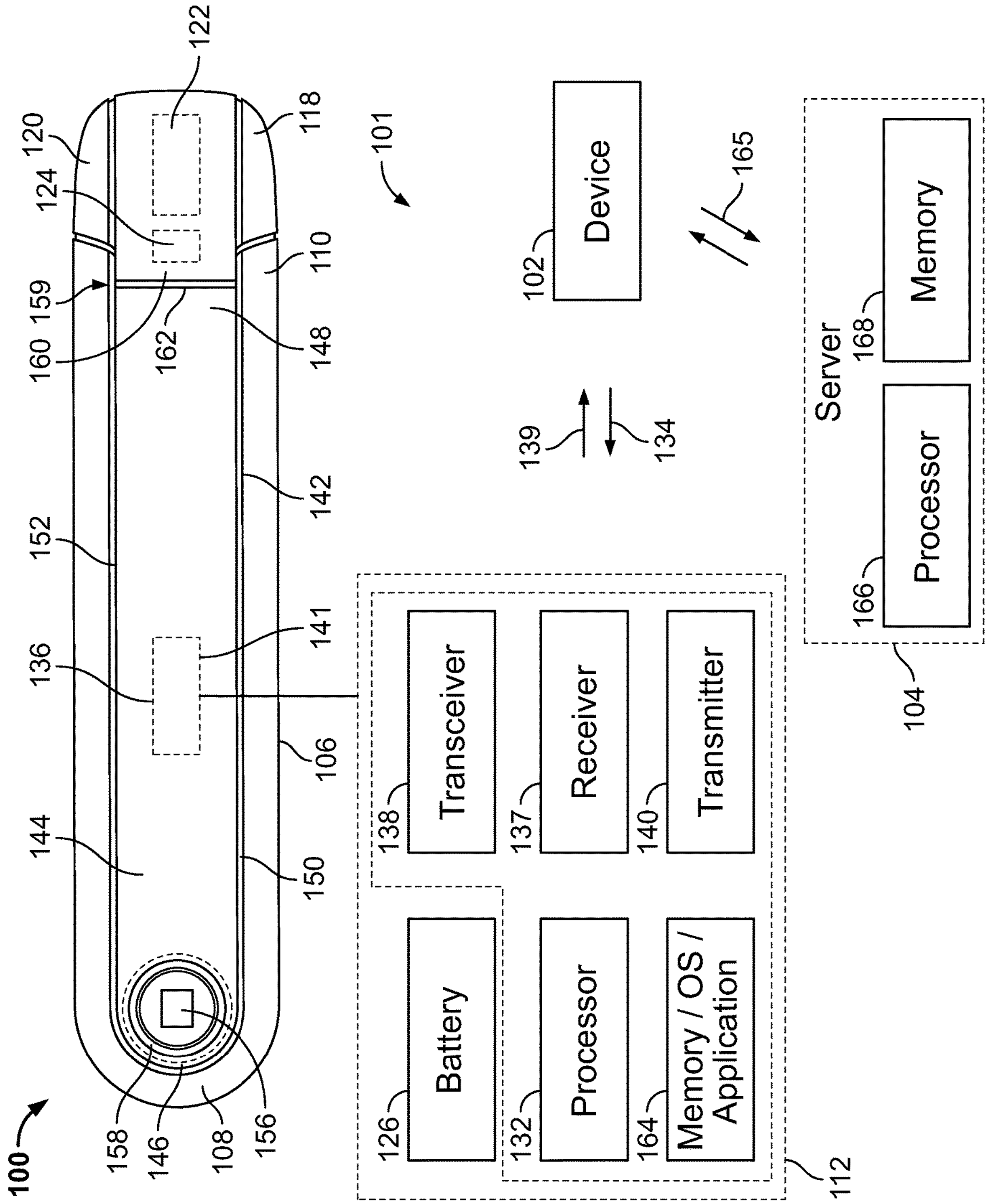
FIG. 1 is a plan view of a vaporization device, partly in schematic form, and assembled in accordance with a disclosed example of the present invention and shown with a removable cartridge having a mouthpiece attached to a body portion; the vaporization device is shown in conjunction with an exemplary system for generating and conveying a signal to and/or from the device from a mobile device.

Referring now to the drawings, FIG. 1 shows a vaporization device 100 assembled in accordance with the teachings of a first disclosed example of the present invention. The vaporization device 100 is shown as part of a system 101 that includes the vaporization device 100, a device 102, and an exemplary server 104. The device 102 may be, for example, a mobile device such as a cell phone, a smart device such as a smart watch, a computer, a tablet, or any other device suitable for communicating with the vaporization device 100. Alternatively, the device 102 may be a beacon (e.g., a low-powered transmitter).

The vaporization device 100 includes a body 106 having a first end 108, a second end 110, and forms an internal cavity 112. A portion 114 of the internal cavity 112 (the portion 114 is best visible in FIG. 6) forms a cartridge receptacle 116 for receiving a removable cartridge 118. The cartridge 118, as would be known to those of skill in the art, includes a mouthpiece 120 and a storage container 122 for storing a quantity of a vaporizable medium which is typically in liquid form. The vaporizable medium may include, for example, a nicotine liquid as commonly employed in the art, although the medium may also include or consist of a botanical essence, a flavor, or any other vaporizable medium of the type commonly employed in the art. The cartridge 118 also includes a heating element 124 which, as is discussed below, operates to heat and thus vaporize a quantity of the vaporizable medium.

Figure 3:
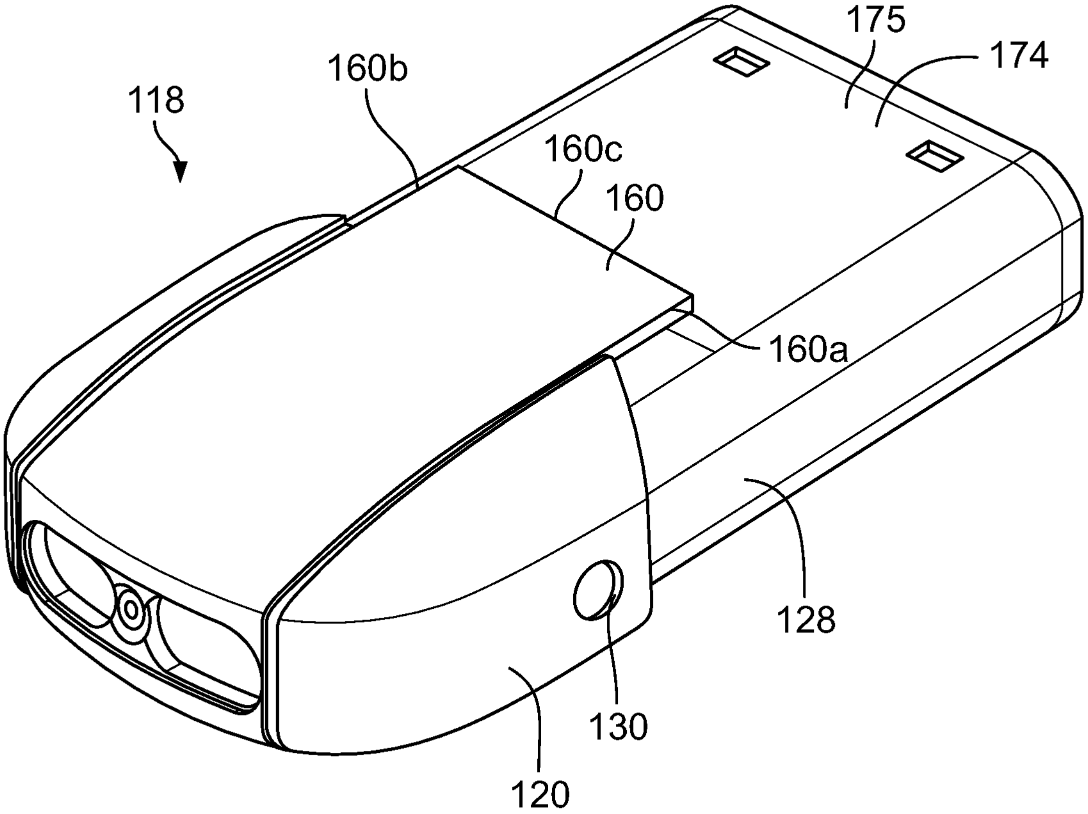
FIG. 3 is an enlarged isometric view of the removable cartridge of FIG. 1.

A battery 126 is disposed in the internal cavity 112 in any suitable manner. The battery 126 may be of the type commonly employed in the art and may be removable and/or rechargeable. The heating element 124 and the battery 126 are operatively coupled to one another when the cartridge 118 is attached to the body 106. Typically, a portion 128 (See. FIG. 3) of the cartridge 118 extends into the cartridge receptacle 116 when the cartridge 118 is secured to the body 106. As is well known to those of skill in the relevant art, the heating element 124 is arranged to apply heat to and thus vaporize a quantity of the vaporizable medium from the storage container 122 of the cartridge 118. As would also be known, the heating element 124 is typically activated when a user, via the mouthpiece 120, draws air that enters through a suitable vent 130 (See. FIG. 3), and flows through the vaporization device 100. Consequently, as would be known, the activated heating element 124 vaporizes the vaporizable medium in the storage container 122, allowing the vapor (typically mixed with air) to be drawn out of the mouthpiece 120 for inhalation by the user.

The vaporization device 100 also includes a processor 132 that is disposed within the body 106 and that is operatively coupled to the battery 126 in any suitable fashion. In operation, the processor 132 is arranged to respond to a signal 134 from, for example, the device 102, such that receipt of the signal 134 by the processor 132 causes the vaporization device 100 to switch between a first operational mode and a second operational mode. In the example shown, the signal 134 is an external signal which is generated from outside of the vaporization device 100. In one exemplary mode of operation, when in the first operational mode, the vaporization device 100 is prevented from operating and/or is turned off, and while when in the second operational mode, the operation of the vaporization device 100 is enabled and/or turned on.

A portion 136 of the body 106 is arranged to permit transmission of the signal 134 from a location external to the body 106 through the portion 136 of the body 106. In the example of FIG. 1, the signal 134 emanates from the device 102, with the signal 134 traveling through the portion 136 of the body 106 to subsequently be received directly or indirectly by the processor 132. The signal 134 can carry an activation code or another command that can be executed by the processor 132. Therefore, receipt of the signal 134 triggers the processor 132 to switch the vaporization device 100 between the first and second operational modes. The first operational mode can be an inoperable mode and the second operational mode can be an operational mode. Alternatively, the first and second operational modes can relate to a power mode, a sensitivity mode or a user mode.

In the example shown, the vaporization device 100 includes a receiver 137, which receives the signal 134 and communicates information in the signal 134 (e.g., the activation code) to the processor 132. The receiver 137 may include any type of communication interface (e.g. a wireless interface) configured to operate in accordance with any suitable protocol(s). For example, the receiver 137 may be configured to communicate using near field communication (NFC), remote communication, Bluetooth®, an audio signal, and/or a voice input. The receiver 137 may also be configured to receive a signal via a dongle (e.g., a micro USB). The signal received via the dongle may carry an activation code or another command that can be executed by the processor 132. Therefore, receipt of the signal via the dongle can trigger the processor 132 to switch the vaporization device 100 between the first and second operational modes.

The receiver 137 of the vaporization device 100 may be a transceiver 138, thus enabling the vaporization device 100 to communicate a response signal 139 from the vaporization device 100 back to the device 102. The response signal 139 may carry information associated with a status of the vaporization device 100. Alternatively, the vaporization device 100 may include a separate transmitter 140 separate from the receiver 137 and operatively coupled to the processor 132.

Referring still to FIG. 1, the portion 136 of the body 106 allows the signal 134 to travel from the device 102 to the receiver 137 or the transceiver 138, and thus be communicated to the processor 132. The portion 136 also allows the response signal 139 to travel from the transceiver 138 or the transmitter 140 to the device 102. In one exemplary form, the body 106 is formed of a first material that does not allow, or is otherwise resistant to or inhibits, the passage of the signal 134 through those parts of the body 106 that are constructed of the first material. On the other hand, the portion 136 of the body 106 may be formed of a second material that does allow the passage of the signal 134 through the portion 136 of the body. As an example, the first material may be metal, and the second material may be a plastic, a ceramic, or a non-metal material. Still other materials may prove suitable for both the body 106 and the portion 136 of the body 106.

In another exemplary form, the portion 136 of the body 106 may be an opening 141 in a surface 142 of the body 106 (the surface 142 is best visible in FIG. 4), and thus the opening 141 allows passage of the signal 134 through to an interior of the body 106, to the receiver 137 or transceiver 138, and ultimately for communication to the processor 132. The opening 141 may be formed in any suitable fashion. For example, the opening 141 may be one or more slits or one or more other suitable apertures in the surface 142 of the body 106. The opening 141 and/or the portion 136 may be formed at the ends 108, 110 of the body 106. Thus, the portion 136 may be formed within the cartridge receptacle 116 and the signal 134 may be received through the portion 136 when the cartridge 118 is received within the cartridge receptacle 116 or when the cartridge 118 is not received within the cartridge receptacle 116.

Additionally, the opening 141 may be covered by a cover 144, with the cover 144 being disposed or removably disposed over the opening 141 in any suitable fashion. In the example of FIG. 1, the cover 144 includes a first end 146 disposed adjacent the first end 108 of the body 106, a second end 148 disposed adjacent the second end 110 of the body 106, and a pair of elongated sides 150 and 152. The cover 144 is sized to be disposed in an elongated recess 154 formed by the surface 142 of the body 106 (the elongated recess 154 is best visible in FIGS. 4 and 5). The cover 144 can be formed of plastic or another suitable material.

Referring still to FIG. 1, the vaporization device 100 may include an illumination assembly 156 which is operatively coupled to the processor 132 and the battery 126. In the disclosed example, the illumination assembly 156 is arranged to display a light signal or a plurality of light signals which may be indicative of a first status, a second status, or more states. For example, the illumination assembly 156 may display no light signal when the vaporization device 100 is in a first state such as the inoperable mode, and may display a light signal when the vaporization device 100 is in a second state such as the operable mode. Light signals may also be used to indicate the status of the vaporization device 100. For example, a first light signal may be used to indicate an amount of power remaining in the battery 126, a second light signal may be used to indicate an amount of liquid remaining in the storage container 122 of the cartridge 118 and a third light signal may be used to indicate a status of the heating element 124 being activated/energized. The first signal may be a first color (e.g., green), the second signal is a second color (e.g., blue) and the third signal may be a third color (e.g., red). However, additional signals may be displayed using different colors. Still further, the illumination assembly 156 may display a first color light signal when the vaporization device 100 is in the inoperable mode, and may display a second and different color light signal when the vaporization device 100 is in the operable mode.

As another example, the illumination assembly 156 may display a first light signal in the form of a graphical character, such as a negative sign or the like, when the vaporization device 100 is in an inoperable mode, and may display a second and different light signal, such as a positive sign, when the vaporization device 100 is in the operable mode. In the example of FIG. 1, the illumination assembly 156 is placed beneath the cover 144, and the cover 144 includes a portion 158 that is transparent or translucent to allow the light signal, in whatever form, if illuminated, to be visible by a user. The portion 158 may be a transparent or translucent disc, or any other suitable structure. Preferably, the portion 158 can provide light-softening characteristics. In the example shown, the portion 158 includes an O-ring.

Referring again to FIG. 1, the vaporization device 100 includes a memory 164. The memory 164 can store an authentication code, commands or reference temperatures or any other data relating to the vaporization device 100. The authentication code can be executed by the processor 132 in response to the processor 132 determining to switch the vaporization device 100 from the first operation mode to the second operation mode.

As an example, when the vaporization device 100 is purchased by a consumer, the vaporization device 100 is in a first operational mode. The first operational mode may prevent the vaporization device 100 from being used or may prevent a feature of the vaporization device 100 from being used. The feature may be associated with a setting of the heating element 124.

As an alternative example, when the vaporization device 100 is purchased, the vaporization device 100 is in a second operational mode. In the second operational mode, the vaporization device 100 can be used for vaping, for example. However, after an event occurs, the processor 132 may switch the vaporization device 100 from the second operational mode to the first operational mode. The event may be associated with an amount of time lapsing or the vaporization device 100 being used a particular number of times.

To activate the vaporization device 100, the device 102 obtains an authentication code from the server 104. To do so, the server 104 is arranged to access identifying information from the device 102 via a signal 165. The identifying information may include an identifier associated with the vaporization device 100 and authenticating information from the consumer. The identifier may be a serial number/product code provided with the vaporization device 100 and the authenticating information may include age identifying information such as a name, a social security number, a driver's license number, age, an address, etc.

To authenticate the consumer and data provided, the server 104 includes a processor 166 and a memory 168. During the authentication process, the processor 166 compares the authentication data to reference authentication data stored at the memory 168. If the authentication data does not match the reference authentication data at the server 104 or if the processor 166 does not otherwise authenticate the consumer, the processor 166 can generate an alert (e.g., an error message). The alert may be provided to the device 102 via the signal 165. The alert may indicate that the vaporization device 100 cannot be activated at this time because the user information provided is not associated with an individual of legal age (e.g., 18-years old; 21-years old, etc.) to use the vaporization device 100 and/or that the consumer is not authenticated to use the vaporization device 100.

However, if the authentication data matches the reference authentication data or if the processor 166 otherwise authenticates the consumer, the processor 166 identifies an authentication code associated with the vaporization device 100 and provides the authentication code to the device 102 via the signal 165. Different authentication codes may be provided to different vaporization devices to change the device from a first operational mode to a second operational mode in which the vaporization device 100 is operable or the feature is unlocked. Alternatively, the same authentication code can be provided to different vaporization devices to change the device from a first operational mode to a second operational mode. The authentication code may be and/or may be referred to as a digital token, a code, a key, a sequence or an audio key.

To activate the vaporization device 100, the device 102 transmits the signal 134 through the cover 144 and the opening 141. The signal 134 is accessed by the receiver 137 and provided to the processor 132. The processor 132 compares the activation code to a reference activation code stored at the memory 164 of the vaporization device 100. In response to the activation code matching the reference activation code, the processor 132 accesses and executes an activation command to enable a capability of the vaporization device 100. Once the capability is enabled, the vaporization device 100 can be used for vaping, for example. The activation command may be stored at the memory 164.

Figure 2A:
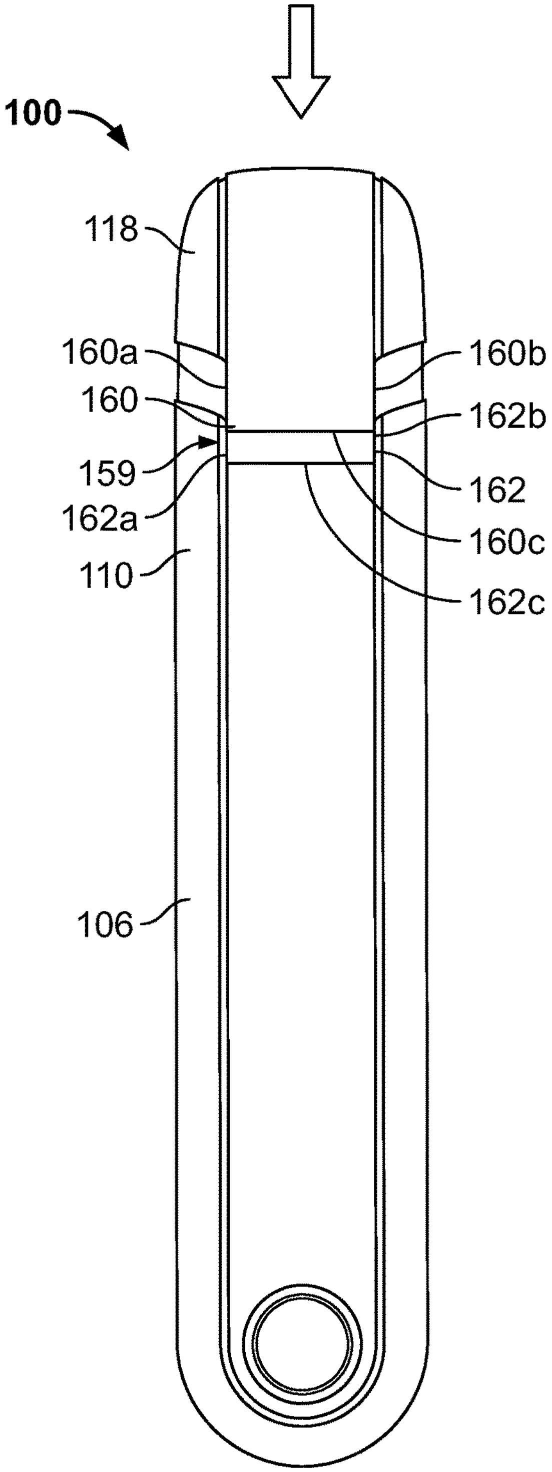
FIG. 2A is a plan view of a cartridge shown partially detached from the body of the vaporization device.

Referring now to FIG. 2A, the cartridge 118 is shown partially received within the cartridge receptacle 116. The vaporization device 100 includes a lateral support assembly 159. In the example shown, the lateral support assembly 159 includes a male structure formed by a protrusion 160 carried by the cartridge 118 and a female structure formed by a cooperating notch 162 that is carried by or formed by the body 106. The protrusion 160 is rectangularly shaped and includes a pair of sides 160*a* and 160*b* and an end 160*c*. The notch 162 has a corresponding rectangular shape and includes a pair of sides 162*a* and 162*b* and an end 162C. Alternatively, the protrusion 160 can be carried by the body 106 and the notch 162 can be formed by the mouthpiece 120. While the protrusion 160 and the notch 162 are shown being rectangular, the protrusion 160 and the notch 162 can be any other corresponding shape. For example, the protrusion 160 and the notch 162 can be triangular, have rounded ends or be another corresponding male/female structure.

Figure 2B:
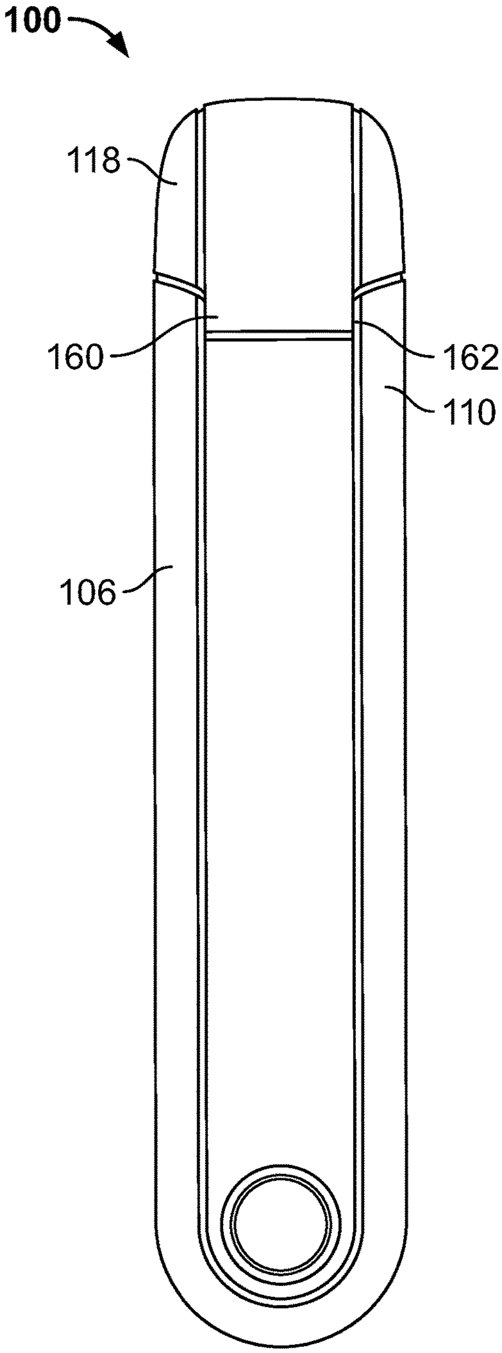
FIG. 2B is a plan view showing the cartridge secured to the vaporization device.

Referring to FIG. 2B, the protrusion 160 is shown received within the notch 162. In the disclosed example, as the cartridge 118 is inserted into the cartridge receptacle 116, the sides 162*a*, 162*b* of the notch 162 engage or otherwise interact with corresponding sides 160*a*, 160*b* of the protrusion 160, guiding the cartridge 118 into the cartridge receptacle 116. Additionally, in accordance with the disclosed example, when the cartridge 118 is received within the cartridge receptacle 116 and the protrusion 160 is received within the notch 162, an engagement between or a proximity of the corresponding sides 160*a*, 160*b*, 162*a*, 162*b* and the ends 160*c*, 162*c* increases the lateral stability of the cartridge 118 within the cartridge receptacle 116.

Referring to FIG. 3, an enlarged isometric view of the cartridge 118 is shown. The mouthpiece 120 is shown positioned adjacent a top surface 174 of a housing 174 of the cartridge 118 and coupled thereto using a snapfit connection.

Figure 4:
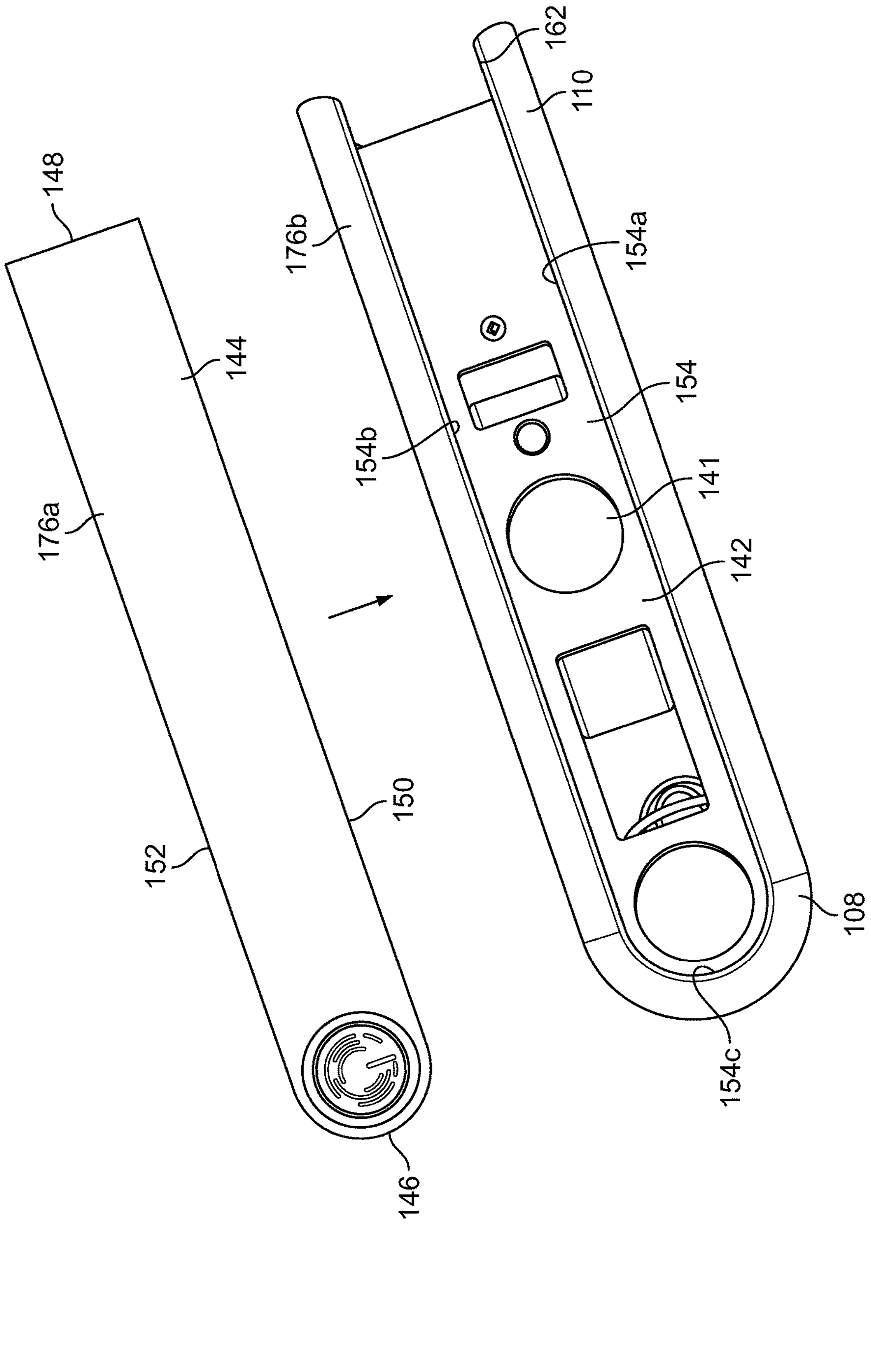
FIG. 4 is an isometric view of a body of the vaporization device separated from the cartridge and with an associated cover spaced from the body.

Referring to FIG. 4, the cover 144 is shown removed from the body 106 and the cartridge 118 is separated from the cartridge receptacle 116. Without the cover 144 covering the surface 142, the opening 141 through the surface 142 of the body 106 and the elongated recess 154 and the notch 162 are more clearly shown. The elongated recess 154 includes a pair of sides 154*a* and 154*b* and a curved end 154*c*. In the disclosed example, the elongated recess 154 is sized to receive the cover 144 such that adjacent surfaces 176*a*, 176*b* of the cover 144 and the body 106, respectively, are substantially flush when the cover 144 is received within the elongated recess 154.

Figure 5:
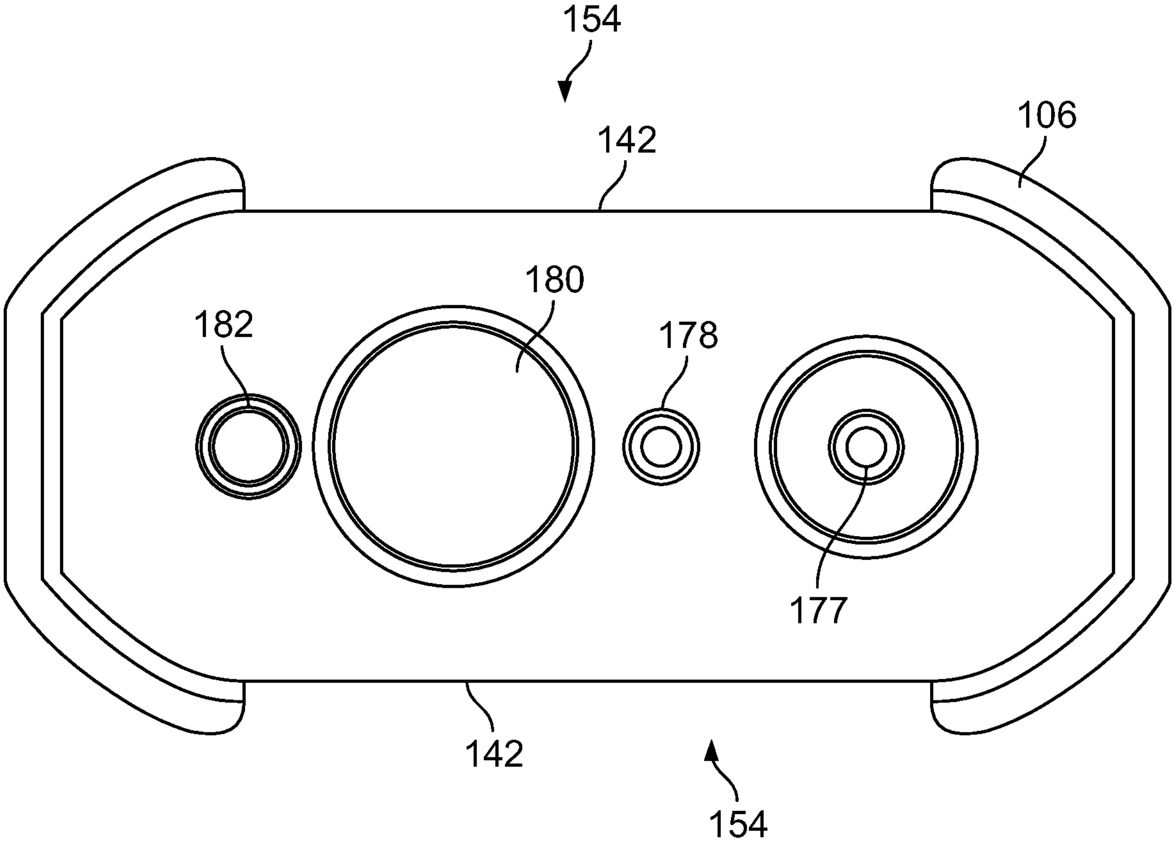
FIG. 5 is an end view of the body of the vaporization device of FIG. 4 with the covers removed.

Referring to FIG. 5, an end view of the body 106 with the cover 144 removed is shown illustrating another view of the elongated recess 154. In the example shown, the body 106 includes opposing elongated recesses 154 that receive the cover 144. FIG. 5 also shows that the vaporization device 100 includes contacts 177, 178, a magnet 180 and a nozzle 182. Details of these components are further described in FIG. 6.

Figure 6:
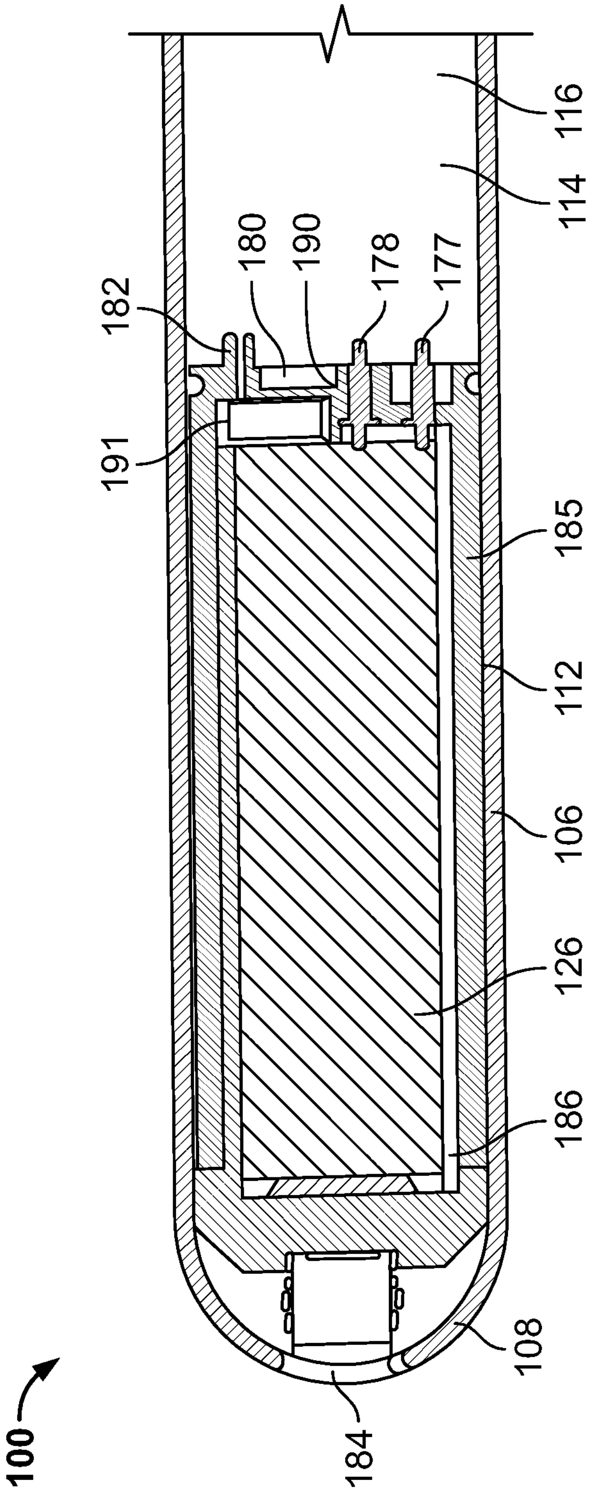
FIG. 6 is an enlarged cross-sectional view of the body of the vaporization device separated from the cartridge.

Referring to FIG. 6, a cross-sectional view of the body 106 of the vaporization device 100 is shown illustrating the internal cavity 112, the cartridge receptacle 116, the battery 126 and a universal serial bus (USB) port 184. The USB port 184 is operatively coupled to the processor 132 and the battery 126.

The cross-sectional view also shows a support 185 disposed within the internal cavity 112. The support 185 includes a cavity 186, the nozzle 182 and a recess 190. The nozzle 182 extends into the cartridge receptacle 116 and is in fluid communication with a sensor 191. The recess 190 faces the cartridge receptacle 116 and receives the magnet 180. The magnet 180 can be used to retain the cartridge 118 within the cartridge receptacle 116. Thus, the cartridge 118 can be releasably but securely held within the cartridge receptacle 116 via the magnet 180. Alternatively, the cartridge 118 can be coupled within the cartridge receptacle 116 via an interference fit or a snap-fit connection. The contacts 177, 178 that are coupled to the battery 126 extend through the support 185 and are used to provide power to the heating element 124.

From the foregoing, it will be appreciated that the above disclosed apparatus, methods and articles of manufacture relate to metal-bodied vaporization devices to receive and/or transmit data. In some examples, the data received at the vaporization device is associated with a command. Some of those commands may include an authentication command that enables usage of the vaporization device. Others of the commands may include a capability enablement command that allows a particular capability to be activated. Regardless of the type of data transmitted, the metal-bodied vaporization devices disclosed herein allow communication to occur that would otherwise not be feasible given the signal transmission characteristics of the metal-bodied devices.

Further, while several examples have been disclosed herein, any features from any examples may be combined with or replaced by other features from other examples. Moreover, while several examples have been disclosed herein, changes may be made to the disclosed examples without departing from the scope of the claims.

What is claimed is:

1. A vaporization device comprising:
- a metal body, including:
  - a cavity,
  - a side surface forming an elongated recess,
  - an opening formed in the side surface and through the body and surrounded by the side surface of the body,
  - a first end; and
  - a second end;
- a storage container suitable for holding a vaporizable medium and disposed adjacent one end of the body;
- a mouthpiece at the first end of the body;
- a plastic portion covering the opening, positioned on the side surface, and disposed in the elongated recess;
- a battery disposed within the cavity of the body;
- a processor operatively coupled to the battery; and
- a transceiver operatively coupled to the processor, wherein the plastic portion is adapted to permit wireless communication through the opening and through the plastic portion between the processor and a location external to the body, via the transceiver.

2. The vaporization device of claim 1, further comprising a cartridge comprising the storage container and wherein the body forms a cartridge receptacle that receives the cartridge.

3. The vaporization device of claim 2, wherein the cartridge is removably receivable within the cartridge receptacle.

4. The vaporization device of claim 2, wherein the cartridge comprises the mouthpiece.

5. The vaporization device of claim 1, wherein the processor is to: 1) identify an occurrence of an event; and 2) responsive to the occurrence of the event, prevent operation of the vaporization device.

6. The vaporization device of claim 5, wherein the processor identifies the occurrence of the event by identifying an amount of time lapsing.

7. The vaporization device of claim 5, wherein the processor identifies the occurrence of the event by identifying the vaporization device being used a particular number of times.

8. The vaporization device of claim 5, wherein the event is associated with a voice input.

9. The vaporization device of claim 5, wherein the event is associated with an audio input.

10. The vaporization device of claim 5, wherein the processor is to activate the vaporization device after receiving a signal from an external device that carries a command to activate the vaporization device.

11. The vaporization device of claim 10, wherein the body comprises a port operatively coupled to the processor and the battery and wherein the signal is received through the port.

12. The vaporization device of claim 11, wherein the port is a Universal Serial Bus.

13. The vaporization device of claim 10, wherein the command comprises a movement sequence of the vaporization device.

14. The vaporization device of claim 1, wherein the processor is to generate a signal and the transmitter is to transmit the signal through the plastic portion to an external device, the signal carrying information associated with a status of the vaporization device.

15. The vaporization device of claim 14, wherein the signal carries information associated with a status of the vaporization device.

16. The vaporization device of claim 14, wherein the signal is a response signal.

17. The vaporization device of claim 1, wherein the wireless communication comprises a voice input.

18. The vaporization device of claim 1, wherein the wireless communication comprises an audio input.

19. The vaporization device of claim 1, wherein the transceiver comprises a wireless interface.

20. The vaporization device of claim 1, wherein the processor is disposed in the body.

21. The vaporization device of claim 1, wherein the transceiver is disposed in the body.

22. The vaporization device of claim 1, wherein the battery is rechargeable.

* * * * *